United States Patent [19]
Thompson

[11] B 3,989,990
[45] Nov. 2, 1976

[54] FEEDBACK FIELD CONTROL FOR AN ELECTRIC VEHICLE

[75] Inventor: Francis T. Thompson, Murrysville, Pa.

[73] Assignee: Westinghouse Electric Corporation, Pittsburgh, Pa.

[22] Filed: May 31, 1974

[21] Appl. No.: 475,236

[44] Published under the second Trial Voluntary Protest Program on February 3, 1976 as document No. B 475,236.

[52] U.S. Cl. ............................. 318/139; 318/331; 318/493; 318/532
[51] Int. Cl.² ........................................ H02P 5/06
[58] Field of Search .......... 318/139, 331, 350, 493, 318/532, 317, 269

[56] References Cited
UNITED STATES PATENTS

| | | | |
|---|---|---|---|
| 3,546,548 | 4/1968 | Wouk | 318/139 |
| 3,569,809 | 3/1971 | Comer | 318/338 |
| 3,599,064 | 8/1971 | Friedman | 318/338 |
| 3,735,220 | 5/1973 | Renner et al. | 318/493 X |
| 3,745,434 | 7/1973 | Lambert | 318/139 |
| 3,845,368 | 10/1974 | Elco | 318/139 |
| 3,855,511 | 12/1974 | Smith | 318/317 |

*Primary Examiner*—Benjamin Dobeck
*Attorney, Agent, or Firm*—W. A. Elchik

[57] ABSTRACT

An electric vehicle having a separately excited field controlled direct current drive motor powered by a direct current power supply wherein field current is pulse-width modulated in response to operator control and the vehicle operating parameters. An armature current demand signal which is dependent on a throttle setting is compared with an actual armature current signal derived from an armature shunt and the difference is applied to a field current output amplifier which supplies current to the separately excited field to reduce the difference to zero. The armature current demand signal is responsive to the operator's control of the throttle in the electric vehicle. The drive motor of the electric vehicle can be operated in the driving mode for moving the electric vehicle or a regenerative mode for braking the electric vehicle and supplying energy to the power supply. The armature demand signal is also influenced by various operating conditions to improve operation of the electric vehicle. For example: in a high voltage connection, when regenerative braking voltages increase above a predetermined level the armature current demand signal is reduced; for a low voltage connection with a high current drain, if battery voltage falls below a predetermined level, such as 30 volts, the armature current demand signal is reduced; for high motor speeds above a given value such as 3,000 rpms, the armature current demand signal is reduced to limit commutation sparking; and, when field current excitation falls below a given minimum value the armature current demand signal is also reduced to limit commutator sparking and prevent possible motor damage. During vehicle operation a minimum pulse-width current signal is always applied to the separately excited field of the direct current drive motor to prevent overspeed and motor damage. To maintain smooth control of the electric vehicle, the armature current demand signal relative to a given throttle setting is shifted as a function of motor speed. Compensating means are provided to limit the variation of field excitation as a function of variation in battery voltages.

15 Claims, 11 Drawing Figures

FEEDBACK FIELD CONTROL FOR AN ELECTRIC VEHICLE

CROSS-REFERENCE TO RELATED APPLICATIONS

This application is related to the following applications:
1. U.S. patent application No. 448,862;
2. U.S. patent application No. 437,405; and
3. U.S. patent application No. 430,107.

BACKGROUND OF THE INVENTION

This invention relates to electric vehicles and more particularly to field control features for use on an electric vehicle driven by a separately excited field control direct current drive motor.

In most prior art electric vehicle speed control systems, a direct current (DC) chopper control and a series wound drive motor are used. The chopper is placed in series between a DC power supply and a series wound drive motor. The DC chopper controls the speed of the DC series motor by controlling and interrupting the full armature current. The speed of the DC drive motor is controlled by conventional armature chopper apparatus which provides complete control of the motor over its entire speed range.

A prior art DC chopper controls the time of the pulses and/or the magnitude of the pulses being sent through the armature of the direct current drive motor. By varying the parameters of the drive pulses being fed to the armature of the DC drive motor the speed of the drive motor can be varied. DC chopper control for armature current coupled with a series wound drive motor is the most common approach used for driving prior art electric vehicles. Since a chopper controls the full armature current, it must of necessity be of a large size to handle the large currents involved. Prior art direct current choppers which are required in the armature circuit are bulky and expensive. The conventional chopper controller, since it must interrupt and control full armature current, requires expensive high-powered thyristor and complicates control circuitry for switching and controlling the load current in the armature circuit. Due to the large currents being interrupted, cooling of the controller is a problem. Conventional chopper controllers for armature current are also rather inefficient at low to normal operating speed.

An electronic system for controlling the torque speed characteristic and regenerative braking of a separately excited drive motor for use on an electric vehicle is disclosed in cross-reference U.S. patent application No. 346,552, Westinghouse Case No. 44,492. The torque speed characteristics can be controlled by varying the separately excited shunt field of the direct current drive motor. As disclosed in the above-mentioned applications, speed of the direct current drive motor is controlled from some base speed to an maximum speed. Field control of the separately excited DC drive motor has a number of advantages including lower cost and lighter weight than the conventional chopper control. A problem with the armature controller as there disclosed is that the speed range above the base speed is not wide enough. Furthermore, due to the dependence of field excitation on battery voltage the maximum motor speed varies excessively as a function of battery voltage, battery resistance and load. It is desirable to have a system that will operate smoothly over a wide speed range and will perform well in spite of changes in battery voltage, battery resistance and load. Maximum motor speed should be well controlled under extreme conditions including high throttle settings while descending a grade. An efficient low power dissipation system is desirable.

SUMMARY OF THE INVENTION

An electric vehicle driven by a separately excited field controlled direct current drive motor is provided with a feedback control system which provides well regulated motor performance in spite of variations in battery voltage, battery resistance and load changes. The separately excited field is energized with discrete voltage pulses having some minimum duration, to maintain motor and vehicle control.

The vehicle throttle setting is converted to an armature current demand signal by an armature current reference means. This armature current demand signal is compared with an armature current signal derived from an armature shunt. The resulting error signal is applied to an amplifier which produces a field current demand signal which controls a field current output utilizing pulse-width modulation to supply the current to the separately excited field. The width of the voltage pulse applied to the field is reduced to decrease excitation and increase the armature current for increased vehicle speed. The field current output amplifier varies field current so that the armature current is changed so as to reduce the armature current error signal.

Due to commutation problems at high motor speed and thermal limitations on the drive motor, it is desirable to reduce the maximum permissible armature current at high motor speeds. This reduction in maximum permissible armature current at high motor speeds is accomplished by reducing the armature current demand signal when the motor speed exceeds a predetermined value. Similarly, the armature current is reduced by decreasing the armature current demand signal for weak field conditions so as to prevent excessive commutator sparking. The disclosed feedback field control system also acts to reduce the magnitude of the regenerative current demand signal if the battery voltage exceeds a predetermined value such as 130 volts. This high voltage could result from regenerative charging current during braking, if the battery circuit resistance was high. Decreasing the regenerative armature current demand signal when battery voltage exceeds a predetermined value protects the electric vehicle circuitry from overvoltage and excessive charging currents. The disclosed electric vehicle also includes the means for reducing the armature current demand signal during motoring in case battery voltage falls below a predetermined, value such as 65 volts. This condition should only occur when drawing heavy currents from a nearly fully discharged battery. Reducing the armature current demand signal will reduce the armature current and increase the system efficiency to help maintain reduced performance for an additional time period. A similar circuit can be used to reduce the motoring armature current demand signal in case the voltage form any of the batteries in the power supply falls below a predetermined value such as 30 volts. This would help prevent controller malfunction and permit continued operation at reduced performance.

In order to maintain smooth control of the vehicle speed, especially down grades, it is desirable to have a continuous control from motoring to regeneration. This can be accomplished by using a speed-dependent characteristic modifier to shift the armature current demand versus throttle setting curve as a function of motor speed or vehicle speed. A speed-dependent current is supplied to bias the throttle output signal. At increased speeds more biasing current is provided to cause a greater shift in the armature current versus throttle setting characteristic. Stable operation in spite of a wide range of battery voltage is obtained by supplying a voltage feedback signal which provides for a wider current pulse for decreasing the battery voltage to attempt to maintain field excitation independent of battery voltage fluctuation. Idling means is provided to maintain the drive motor in idling speed when the vehicle stops for short periods of time without turning off the ignition.

It is an object of this invention to provide an electric vehicle driven by a separately excited direct current drive motor where the field is excited by current pulses which are compensated for variations in battery voltage.

It is another object of this invention to provide an electric vehicle wherein the magnitude of armature current is reduced due to overspeed, overvoltage of the battery during regenerative braking, or reduced battery voltage due to a heavy current drain while motoring.

It is a further object of this invention to provide an electric vehicle wherein the armature current is reduced when the field excitation falls below some predetermined value, and to provide for a minimum field excitation.

BRIEF DESCRIPTION OF THE DRAWINGS

For a better understanding of the invention, reference may be had to preferred embodiments, exemplary of the invention, shown in the accompanying drawings, in which.

DESCRIPTION OF THE PREFERRED EMBODIMENTS

Figure 1:
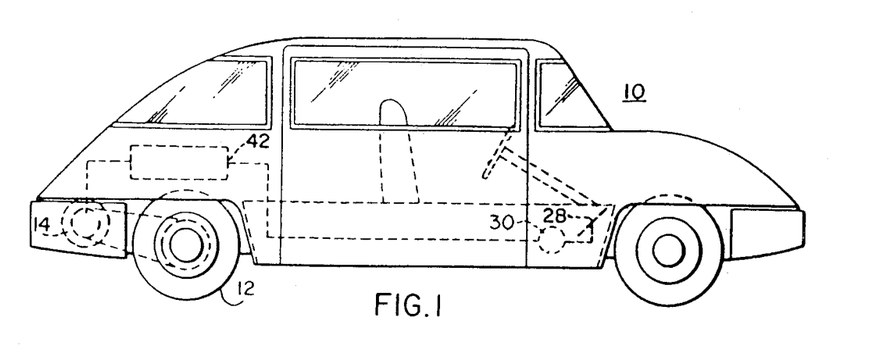
FIG. 1 shows an electric vehicle.

Referring now to the drawings, there is shown an electric vehicle 10 having a control system utilizing the teaching of the present invention.

Electric vehicle 10 has drive wheels 12 driven through a drive system by a direct current drive motor 14. The DC drive motor 14 is of the type having shunt field windings 18, shown in FIG. 2C which can be separately excited for speed and torque control. A torque converter can be utilized to control the speed of electric vehicle 10 when operating at less than the predetermined base speed as described more fully in U.S. patent application No. 346,199. A direct current power supply which is normally a battery pack 16, shown in FIG. 9, which can be connected in a high voltage connection or a low voltage connection, supplies power to the direct current drive motor 14. The separately excited field winding 18 of the direct current drive motor 14 is supplied with excitation current from controller 42, shown in FIG. 9. The excitation current supplied to the field windings 18 controls the torquespeed characteristics and the regenerative braking of separately excited direct current drive motor 14.

Figure 3:
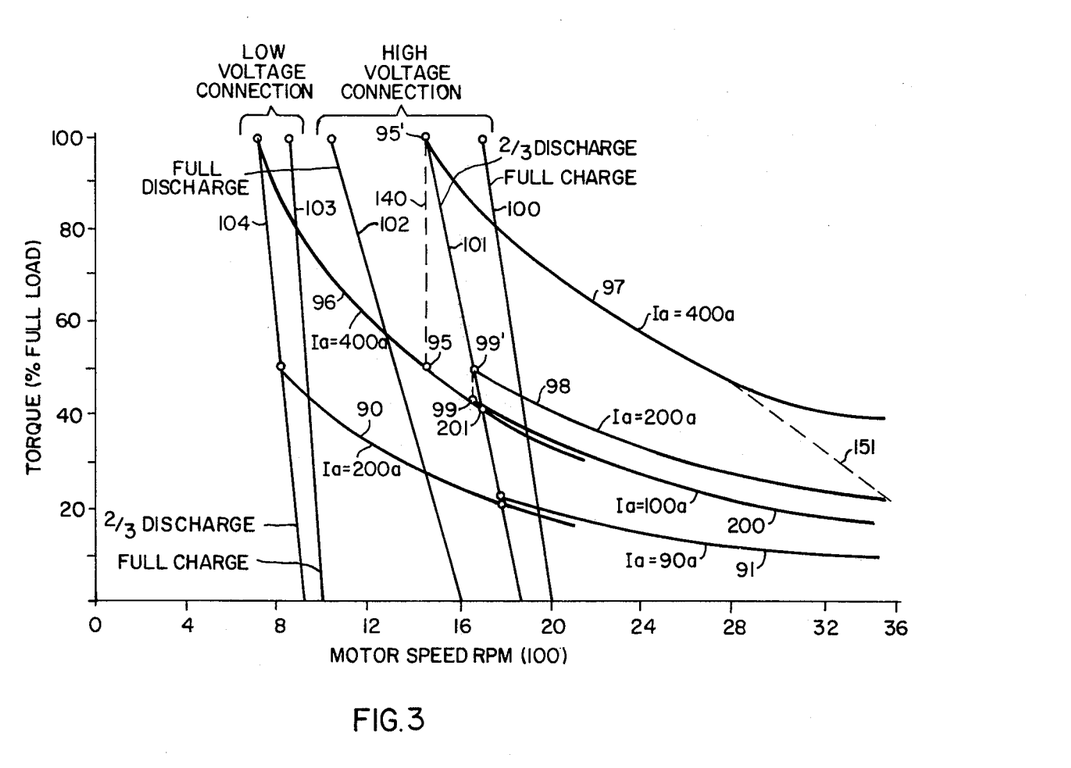
FIG. 3 is a graph of torque versus motor speed for various battery conditions of charge of both the high voltage connection and the low voltage connection.

At low speeds it is only possible to operate electric vehicle 10 with the low voltage battery connection because obtainable back emf of the motor 14 is inadequate to maintain control of the armature current for the high voltage connection. Once a high enough speed is reached operation at a high voltage or low voltage is possible. Since electric vehicles 10 performance and efficiency are considerably better for the high voltage connection, it is important to select the high voltage connection whenever possible. The minimum speed of drive motor 14 for which operates at the high battery voltage is possible, is a function of a number of variables: battery open circuit voltage, battery resistance, armature current, armature resistance, and field flux. The problems associated with switching to the high voltage level can be more easily understood by reference to FIG. 3 which shows the output torque versus motor speed of drive motor 14 for various armature currents for both the high voltage and low voltage connection. A locus of 100 percent field points for the high and low voltage connections with different battery charge states is shown. The 100 percent field lines are indicated in FIG. 3 by lines 100, 101, 102, 103 and 104. The 100 percent field lines are shown for various conditions: line 100 is for a high voltage connection with the battery fully charged; line 101 is for a high voltage connection with the battery two-thirds discharged; line 102 is for a high voltage connection with the battery fully discharged; line 103 is for a low voltage connection with the battery fully charged; and, line 104 is for a low voltage connection with the battery two-thirds discharged. An optimum strategy results from operating in the high voltage connection whenever the operating point falls to the right of the high voltage 100 percent field locus 100, 101, or 102 and operating in the low voltage connection whenever the operating point falls to the left of the high voltage 100 percent field locus 100, 101 or 102. Any attempt to operate to the left of the locus in the high voltage connection will result in higher than desired armature current and therefore higher than desired torque. This is due to the fact that the separately excited field is quite saturated for 100 percent field and therefore additional motor emf is not available.

Figure 4:
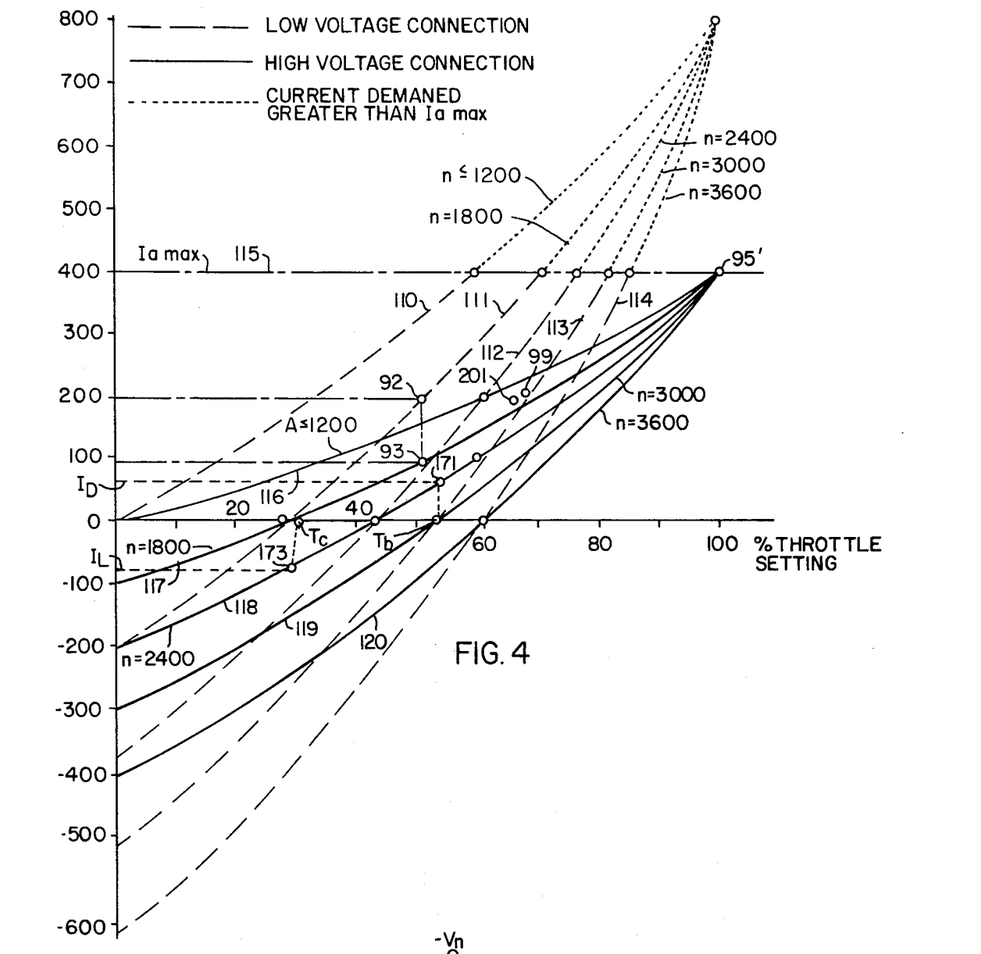
FIG. 4 is a graph showing armature current versus throttle setting for various drive motor speeds with the high voltage battery connection and the low voltage battery connection.

Referring now to FIGS. 3 and 4, some examples of battery switching with and without torque matching will be given. As shown in FIG. 3 for an armature current in a low voltage connection Ia1 = 200 amps, a curve represented by line 90 is obtained for a two-thirds discharge battery in the low voltage connection. Ia max is set at 400 amps to protect the motor. When the batteries are switched from the low voltage connection to the high voltage connection field excitation is increased. When battery connections are switched Iah, armature current at the high voltage connection, will be approximately equal to 90 amps as indicated by line 91 of FIG. 3. The batteries will be switched at a speed approximately equivalent to that indicated when line 90 cross the 100 percent field locus 101 for a two-thirds discharge battery. As can be seen at this point the torques before and after switching are almost matched. This switching operation can be illustrated from the curves in FIG. 4. For a speed approximately equal to 1800 rpm, an armature current in a low voltage connection equal to 200 amps is drawn. The battery connection can be switched at point 92 on curve 111 to point 93 on curve 117 and the torque matching armature current in the high voltage connection will be equal to approximately 90 amps.

With a maximum armature current limit of 400 amps, a low voltage connection having a throttle setting which demands low voltage current greater than 400 amps will be switched with an increase in torque. For example, if the throttle is completely depressed so that the maximum armature current will be demanded in both the low and high voltage connections, the vehicle will switch at a speed equivalent to line 95–95' shown in FIG. 3 to the high voltage connection and the vehicle operation will continue along line 97. That is the vehicle operating characteristics will switch from curve 96 to curve 97 along the dashed line 140 from point 95 to point 95'. For a throttle setting with an armature current in the high voltage connection of 200 amps, high voltage operation will be along curve 98. The transfer point for switching battery connection will be at a speed equivalent to point 99. In these cases a torque increase will occur when switching from the low voltage connection to the high voltage connection. For a throttle setting demanding a high voltage connection armature current equal to approximately 180 amps operation will be along curve 200. The torques will be matched before and after the switching and the transfer from the low voltage connection to the high voltage connection will occur at point 201. In FIG. 4, point 95', point 99' and 201 for the high voltage connection are indicated.

Figure 5:
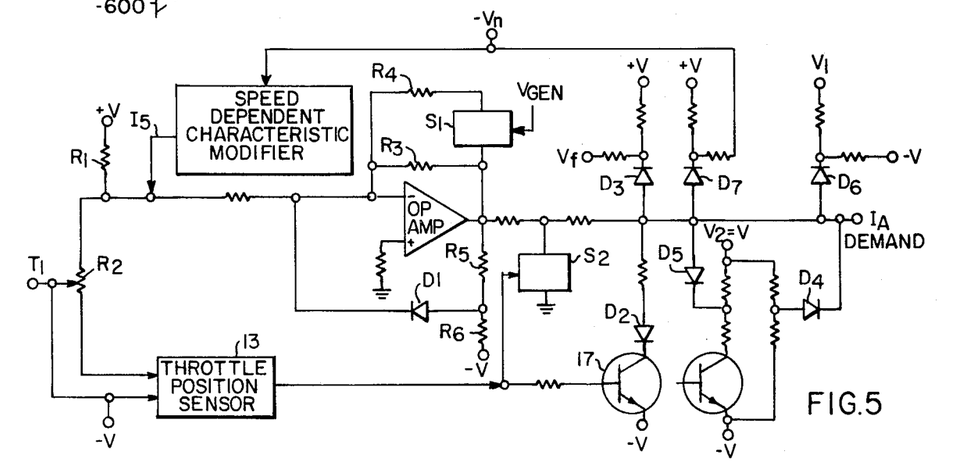
FIG. 5 is a schematic showing an armature current reference circuit utilizing the teaching of the present invention.

Referring now to FIG. 5 there is shown an armature current reference circuit embodying the teaching of the present invention. Low voltage or high voltage operation is selected by solid-state switch S1 which conducts to select the high voltage characteristics. For throttle settings which demand an armature current greater than the maximum armature current 115 the actual armature current is limited by the conduction of diode D1. For low throttle settings of T1 which call for negative armature current that produce regenerative braking, the throttle position sensor 13 detects this condition and causes transistor 17 to conduct a current through diode D2 that calls for a preset value of regenerative armature current. For throttle settings above a preselected setting of T1 current I1 causes transistor 15 of FIG. 6 to conduct. For low throttle settings of T1 or less, the resistance of the lower portion of the throttle potentiometer R2 is low enough to shunt current I1 to −V and transistor 15 blocks indicating the throttle is positioned at a low value.

Due to commutation problems at high motor speed and thermal limitations of the motor it is desirable to reduce the maximum permissible armature current at high motor speed as indicated by curve 151 of FIG. 3. This may be accomplished by a speed-dependent signal which causes diode D7 of FIG. 5 to conduct at high speeds and reduce to the maximum value of the Ia demand signal. Diode D7 is normally nonconducting. A similar circuit involving diode D3 reduces the valuue of armature current for weak field conditions to prevent excessive commutator sparking. The circuit including diode D4 which is normally reverse biased acts to reduce the magnitude of the regenerative current demand signal should the battery voltage exceed a predetermined value such as for example 130 volts. This high voltage would result from excessive regenerative charging currents especially if the battery circuit resistance was high. This protects the circuitry from overvoltage and excess charging current.

The portion of the circuit including diode D5 which is normally reverse biased acts to reduce the motoring current demand signal Ia demand in case the battery voltage falls below a predetermined value when the direct current drive motor is operating in the motoring mode. This condition should occur only when drawing heavy currents from a nearly fully discharged battery. Reducing Ia demand will reduce the armature current and will increase the system efficiency and help maintain reduced performance for an additional period of time. A similar arrangement including diode D6 can be used to reduce the motoring current demand signal Ia demand in case the voltage from any of the batteries supply and control fall below a predetermined value which is 30 volts. This prevents controller malfunction and permits continued operation at a somewhat reduced performance.

Figures 6, 7, 8, 9:
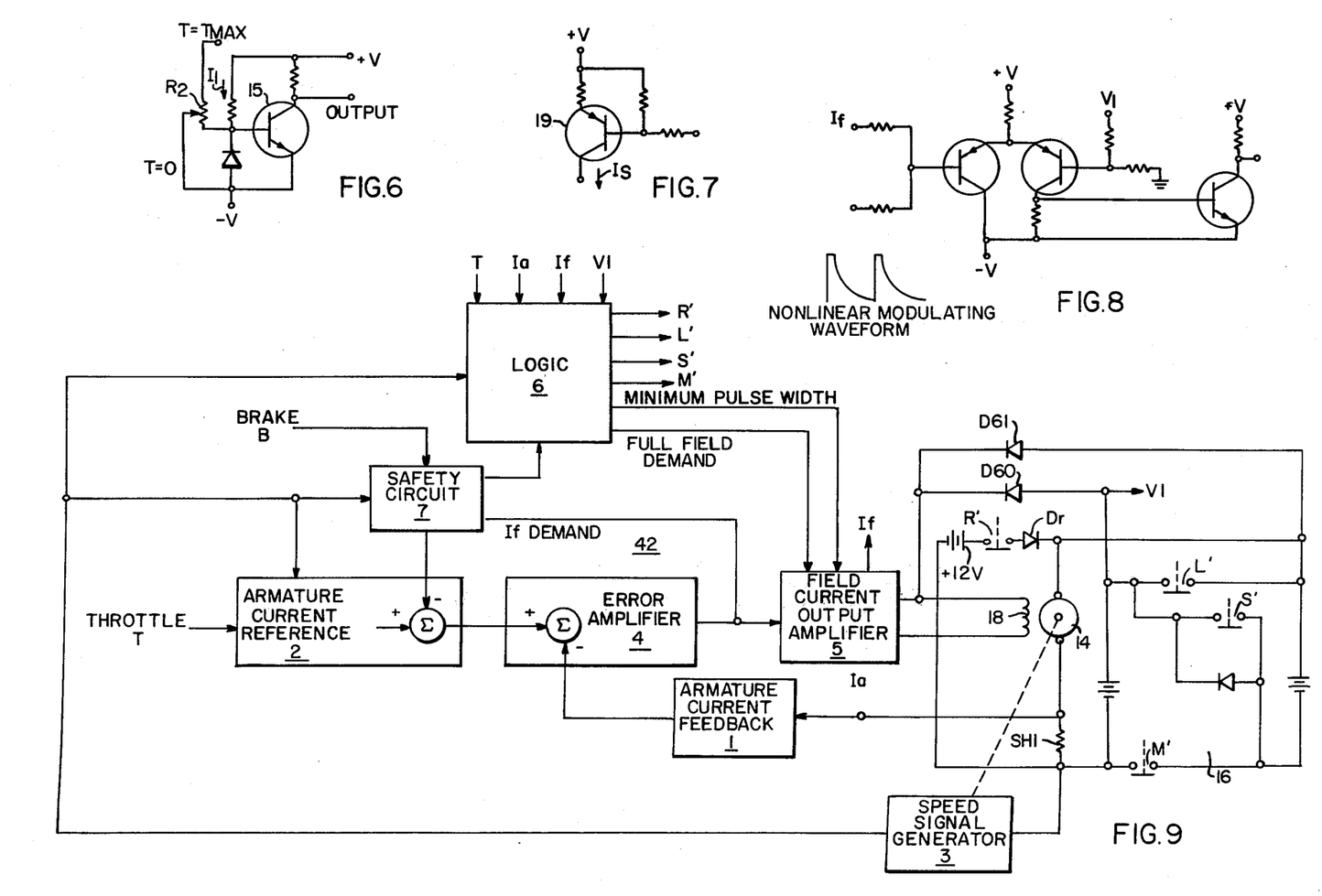
FIG. 6 shows a schematic of a throttle position sensing circuit.
FIG. 7 shows a schematic of a speed-dependent characteristic modifier shown in block diagram in FIG. 5.
FIG. 8 shows a schematic of a pulse-width modulator circuit.
FIG. 9 is a block diagram of the electric circuit illustrated in FIG. 2 for controlling operation of an electric vehicle.

In order to maintain smooth control of the vehicle speed especially down grade, it is desirable to have continuous control from motoring to regeneration. This can be accomplished by using a speed-dependent characteristic modifier to shift the Ia demand versus throttle setting curve as a function of motor speed. FIG. 7 illustrates the speed-dependent characteristic modifier which can be used with the circuit of FIG. 5, according to the teaching of this invention. The Ia demand versus throttle setting curve could also be shifted as a function of the vehicle speed. Assume the vehicle is proceeding on a level road at about 40 mph with a motor speed of 2400 rpm, a throttle setting Tb and an armature current Ib as shown in FIG. 4. The vehicle is now operating at point 171 on curve 118. If the vehicle then proceeds downhill and the driver backs off the throttle to position Tc to maintain a desired speed which may still correspond to 2400 rpm the vehicle will now be operating at point 173 on curve 118. This calls for a regenerative armature Ic. Thus, the throttle characteristics shown provide a range of control from motoring through regeneration when operating at speeds where regeneration is useful and at the same time provides positive throttle response at low throttle settings for low speed operation. The speed-dependent characteristic modifier of FIG. 7 simply supplies the current Is to bias the throttle characteristics as shown in FIG. 4. As the speed increases transistor 19 conducts more current to provide more shift in the characteristic. As shown, both the high voltage characteristics, solid lines, and the low voltage characteristics, dashed lines, are shifted from their relative values and continue to provide torque matching for a predetermined low throttle setting range.

System stability in spite of non-linear field flux as a function of field current is obtained by using a nonlinear waveform to the pulse-width modulator of FIG. 8. Stable operation in spite of a wide range of battery voltage is obtained by a voltage feedback signal which provides a wider pulse-width for decreasing battery voltage to attempt to maintain field current in spite of battery voltage fluctuations. The disclosed feedback control system provides for a single throttle control potentionmeter and provides for efficient operation by using low dissipation pulse-width modulated output to control field current. Shifting of the throttle demand characteristic as a function of speed provides for a smooth transition from motoring to regeneration.

Referring now to FIGS. 1A, 2B and 2C and 9, there is shown a feedback field control circuit 42 for an electric vehicle utilizing the teaching of the present invention. This control circuit 42 will now be described in detail.

The feedback field control circuitry can be divided into a number of functional areas:

1. Armature Current Feedback 1 — provides an output feedback signal proportional to armature current. A shunt SH1 provides a signal having a value of 0.1 mv per ampere of armature current. The armature current feedback 1, provides a signal which is inversely proportional to armature current (Ia) having for instance a value of 7V for Ia = +400A, 11V for Ia = O, and 15V for Ia = −400A.

2. Armature Current Reference 2 — provides an armature current reference signal which represents the desired value of motor armature current. The output voltage signal of the armature current reference is a function of throttle P1 setting, throttle switch S1, and motor speed. The output signal of the armature current reference 2 is also influenced by various operating conditions such as: 1. for the high voltage connection regenerative voltages above 130V tend to reduce the regenerative armature current demand signal; 2. for the high voltage connection where a high current drain pulls baattery voltage below 30V the armature current demand signal is reduced; 3. for higher motor speeds, above 3000 rpm, which may cause commutator sparking and damage, the armature current demand signal is reduced; and, 4. for low field current values the armature current demand signal is reduced.

3. Speed Signal Generator 3 — produces a signal having a frequency proportional to motor speed, where energy per pulse is constant so current varies as speed. This signal is modified to provide an output voltage inversely related to motor speed. For example, the output signal = 17V at zero speed and decreases 3 volts for each 1000 rpm increase in speed. This voltage proportional to speed is applied to the armature current reference 2 to shift the armature current demand signal as a function of speed.

4. Error Amplifier 4 — compares the armature current reference signal with the armature current feedback signal and provides a voltage signal which is proportional to the desired value of field current.

5. Field Current Output Amplifier 5 — amplifies the voltage signal from the error amplifier 4 and provides field current to the drive motor 14. The field current output amplifier 5 uses pulse width modulation with some minimum pulse width provided for supplying a minimum value of field current to the drive motor 14. The field current output amplifier is coupled to the 48V battery supply to keep field output current constant as battery voltage decreases. Before starting and when idling maximum field current is regulated at 8 amps.

6. Logic 6 — determines when to switch battery connections. On starting, contactor L is first energized then after a slight time delay M is energized. Logic 6 initiates switching battery connections at the optimum time.

7. Safety Circuits 7 — provide safety features some of which are:

1. depressing the brake pedal results in regenerative braking even with the throttle wide open;
2. if motor speed exceeds 3700 rpm, full-field current is demanded and the throttle signal is cancelled;
3. if armature current exceeds 500 amps full-field current is demanded;
4. a field current of at least 8 amps must be present before voltage can be applied to the armature; and, 5. if the drive motor overheats the armature current feedback signal is increased and actual armature current will be reduced permitting operation at reduced performance.

8. Power Supply 8 — provides regulated +11V, +12V, +14V, and +22V output supplies even though the input voltage varies over a wide range.

The functional areas listed above will now be described in more detail.

1. ARMATURE CURRENT FEEDBACK

Figure 2A:
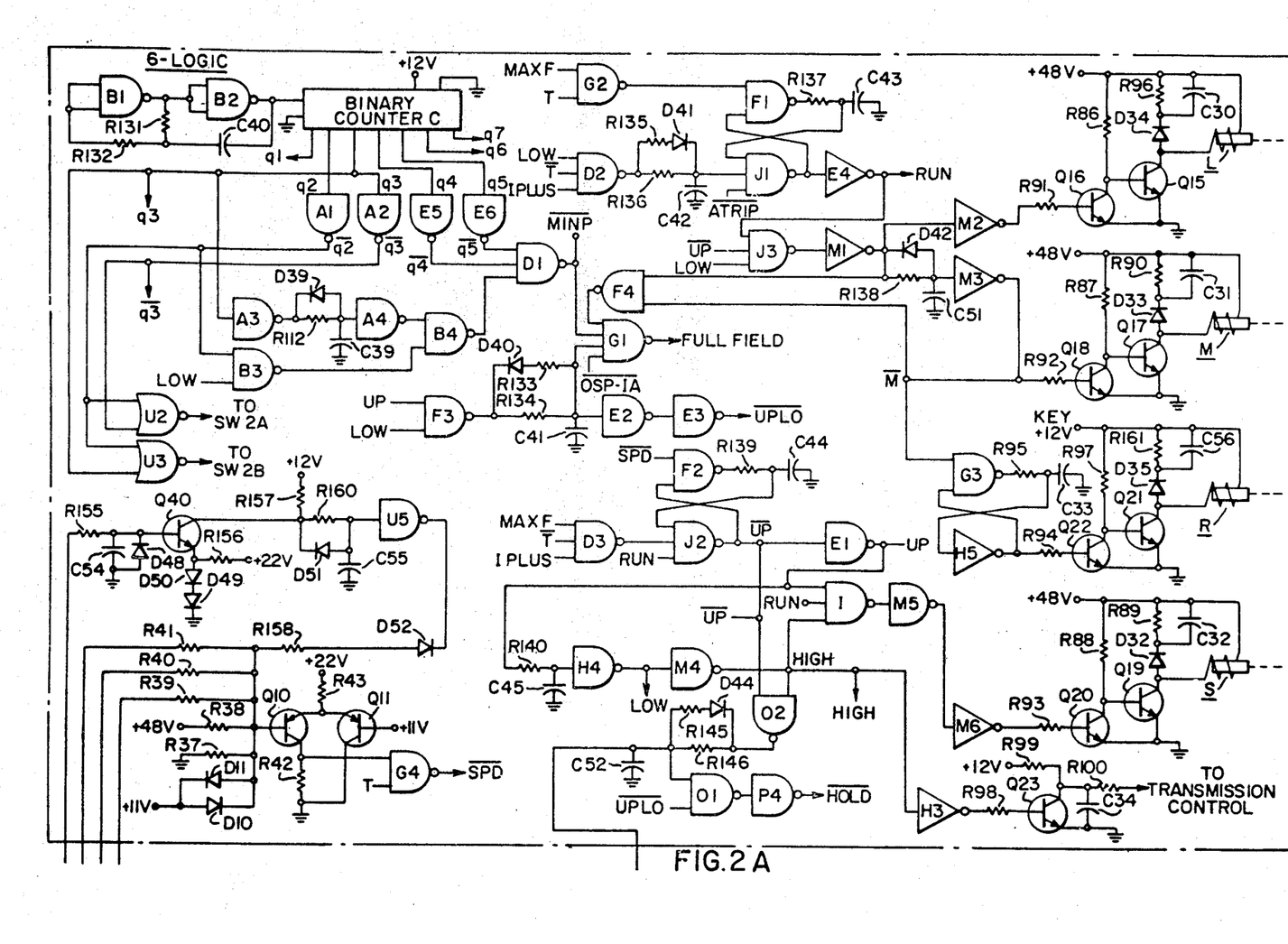
FIGS. 2A, 2B and 2C show a detailed feedback field control circuit utilizing the teaching of the present invention.

The armature current of the motor flows through a 0.1 milliohm shunt SH1. The signal from the shunt SH1 is brought to the control by means of a twisted shielded pair of wires to terminals connected to resistors R1 and R3. Resistors R1 and R3, in conjunction with capacitors C1 and C2, form a low pass filter which minimizes the introduction of spurious electrical noise signals into the control. The second section of filtering is provided by resistors R2 and capacitor C3. The signal from the shunt can have either a positive or negative polarity depending upon whether the motor is being operated in the motoring or regenerative mode. The shunt SH1 provides a 40 millivolt signal for an armature current of 400 A. This signal, after filtering, appears across capacitor C3.

Field effect transistors Q1 and Q2 function as high frequency switches which alternately select a zero voltage and the voltage across C3 at a chopping rate of 8 kHz. This chopped voltage appears across field effect transistor Q2 and is coupled to an ac amplifier circuit by means of capacitors C7 and C6. The ac amplifier circuit consists of operational amplifier IC-1a, resistors R6, R7, R8, R9, R10, R11 and capacitor C8. This amplifier increases the amplitude of the square wave voltage appearing across transistor Q2 by a factor of approximately 32. The amplified signal from the output of the operational amplifier is coupled to a demodulating circuit by capacitor C9. The demodulating circuit consists of resistors R12 and R13, capacitor C10, and switches 2A and 2B. Diodes D3 and D4 are normally non-conductive and serve only to protect the demodulator from excessive transient voltage excursions.

Switches 2A and 2B alternately conduct to provide a sample-and-hold type circuit in conjunction with capacitor C10. For zero armature current, the output at the junction of capacitor C10 and resistor R13, remains at the reference signal level of 11 volts. For a positive value of armature current, the output signal at the junction of R13 and C10 is negative with respect to the 11 volt reference level. This signal is amplified by the voltage follower circuit consisting of operational amplifier IC-1b and resistors R14 and R15. The output of this operational amplifier IC-1b is a voltage which is proportional to armature current and is called the armature current feedback signal. For zero armature current, this signal has the reference level of 11 volts. It has a value of 7 volts for a 400 ampere armature current, and a value of 15 volts for a −400 ampere armature current.

2. ARMATURE CURRENT REFERENCE

The purpose of the armature current reference 2 circuit is to generate a voltage which represents the desired value of motor armature current. This voltage is a function of the throttle position as indicated by the resistance of potentiometer P1, throttle switch S1 and motor speed. Potentiometer P1, in conjunction with resistors R26 and R65, form a voltage divider network which provides a voltage at the junction of resistors R26 and R65 which is a function of the throttle setting. The value of this voltage is also influenced by the collector current of transistor Q7 which provides a current that is dependent on motor speed. A voltage related to motor speed is applied to the base of transistor Q7 by means of Zener diode D8 and resistors R68 and R67. This base voltage becomes less positive as the motor speed increases and thereby provides a collector current which increases with increasing motor speed. The proprotionality between this current and the base voltage is determined by the value of resistor R66. The collector current in conjunction with the voltage divider network and potentiometer P1, provides a voltage which is a function of both motor speed and throttle setting, and permits smooth control of the motor in both the motoring and regenerative braking modes. This can be seen in FIG. 4 which shows the armature current versus the throttle setting curves shifted as a function of motor speed. Capacitor C15 serves to filter out extraneous electrical noise signals.

The signal from the junction of resistors R26 and R65 is amplified by the amplifier stage consisting of operational amplifier IC-4A, resistors R31, R32, R33, R34, R35, R36, capacitor C22, diode D9, and switch 2C. The gain of this amplifier depends on whether the motor is being operated in the high voltage battery connection or the low voltage battery connection. In the low voltage battery connection switch 2C is open-circuited and the gain of the amplifier in the linear region is determined by the ratio of resistors R35 and R31. The maximum positive value of the amplifier output is limited by the network consisting of resistors R34 and R32 and diode D9 which conducts only for output voltages exceeding a given positive value with respect to the reference signal level of 11 volts. Capacitor C22 serves to reduce the gain for high frequency noise signals.

When the motor is operating with the high voltage battery connection, switch 2C conducts, thereby placing resistor R36 in parallel with resistor R35. This reduces the amplifier gain to approximately 46% of the gain obtained when operating in the low voltage battery connection. This change in gain serves to reduce the armature current reference demand for the same throttle setting when operating from the high voltage battery connection. This gain change makes it possible to approximately match the motor torques at low throttle settings independent of the low voltage or high voltage battery connection.

Throttle switch S1 is closed for throttle settings of less than 5%. With switch S1 closed, a ZERO signal is coupled to gate $U_4$ by means of low pass filter R28-C50. Diode D21 protects the gate from reverse voltage transients. With switch S1 closed, the output of gate $U_4$, which is labeled T, has a logical value of ONE. This signal is coupled through NAND gate $H_1$ to provide output signal T, which has a value of ZERO when the throttle switch is closed. This signal is applied to NAND gate $K_1$ which in turn applies a ONE signal to the input of NAND gate $K_2$. This signal in conjunction with a RUN signal of value ONE, which indicates that the motor is running, provides a ZERO Output from NAND gate $K_2$. This ZERO signal is connected to NAND gate $L_1$ which provides a ONE signal to switch 2D. This causes switch 2D to conduct and hold the voltage at the junction of resistors R70 and R71 at the reference value of 11 volts. The ZERO output of NAND gate $K_2$ causes diode D24 to conduct and provide a current through resistor R76. This current causes a current reference value which demands regeneration.

During regeneration, when operating in the high voltage connection, the nominally +96 volt battery voltage 96 may increase to over 100 volts. If the battery develops a high resistance due to a poor cell or a high resistance connection, the voltage could rise substantially higher. In order to protect the field control circuit from excessive voltage, the network consisting of resistors R74 and R75 and diode D23 reduces the value of the regenerative current demand if the battery voltage exceeds 130 volts.

The power supply of the field control operates from the nominally 48-volt battery voltage. When the batteries are nearly discharged, and when drawing high values of armature current, this voltage may fall to less than 30 volts unless the value of the armature current is suitably limited. The network consisting of resistors R72, R73 and diode D22 acts to reduce the value of motoring armature current whenever this battery voltage falls below 30 volts. Under this condition diode D22 conducts and limits the armature current reference and thereby prevents the voltage to the control from becoming excessively low.

At higher speeds, it is necessary to reduce the armature current in order to avoid sparking at the commutator and also to avoid excessive heating of the motor while running the vehicle continuously at high speeds. A signal obtained from the speed signal generator described below is introduced through resistor R44 to the junction of resistor R45 and diode D12. As the motor speed increases the signal applied to R44 becomes increasingly negative which lowers the voltage at the junction of R44 and R45. At approximately 3000 rpm, diode D12 begins to conduct thereby reducing the current reference signal applied to operational amplifier IC-4b. The current conducted by diode D12 increases with a further increase in motor speed, thereby further reducing the armature current reference signal.

Difficulties with commutator sparking also tends to occur at low field current values. The signal output from operational amplifier IC-4b is proportional to field current and becomes less positive as the field current is reduced. This signal is applied through resistor R48 to the junction of resistor R46 and diode D13. As the field current is decreased, the voltage at the junction of R46 and R48 becomes less positive until diode D13 begins to conduct. The current flowing through diode D13 serves to reduce the value of armature current reference.

3. SPEED SIGNAL GENERATOR

The speed signal generator 3 has a magnetic pickup which is magnetically coupled to a gear on the motor shaft providing a signal with a frequency proportional to motor speed. The signal from this pickup which has a sinusoidal waveform is applied to resistor R52 of the speed signal generator. Resistor R53 serves to apply a bias current to input transistor Q8 by means of resistor R54. Capacitor C18 serves to attenuate any noise signals applied to the speed signal generator input. Diode D15 protects the transistor input from negative voltages. Transistor Q8 is biased so as to produce a square wave output at its collector. The collector signal is fed back to the input of the transistor by means of inverter gate $U_1$ and resistor R55. This signal provides hysteresis which helps to provide a good switching waveform from transistor Q8. The input signal applied to capacitor C19 varies between zero volts when transistor Q8 is conducting, and 11.7 volts as determined by reference Zener diode D16 when transistor Q8 is blocked. During the transition of this voltage toward zero volts, diode D17 conducts and places a charge across capacitor C19. When transistor Q8 blocks and the voltage applied to the capacitor rises toward 11.7 volts, diode D18 conducts and discharges the capacitor into the input of operational amplifier IC-5a. The same amount of electrical charge is transferred through diode D18 into the operational amplifier IC-5a input during each cycle of the square wave input. Therefore, the average current applied through diode D18 is proportional to the frequency of the input signal which is in turn proportional to motor speed. The proportionality between the output signal from operational amplifier IC-5a and speed is determined by the value of resistor R59. Resistor R60 provides a biasing input to the operational amplifier IC-5a and thereby determines the voltage output for zero speed. Capacitor C21 serves to filter the ripple from the output signal and thereby provide a low ripple output voltage. Resistor R57 and capacitor C20 act as a low pass filter to provide an 11 volt bias to the anode of diode D17. Resistor R58 provides the 11 volt reference bias to the positive input of operational amplifier IC-5a. The output of operational amplifier IC-5a is a voltage linearly related to motor speed which has a value of approximately 17 volts at zero speed, and decrease linearly in voltage by 3 volts for each 1000 rpm increase in speed.

4. ERROR AMPLIFIER

The error amplifier 4 compares the armature current reference signal applied through resistors R70 and R71 as modified by the currents from diodes D12, D13, D22 and D23, with the armature current feedback signal, from IC-1b, applied through resistors R22 and R23. The difference in these signals represents an error signal which is amplified by operational amplifier IC-4b to provide a voltage signal which is proportional to the desired value of field current. In the steady state the gain of the operational amplifier IC-4b is determined by resistor R47, while for more rapid variations the gain is determined by resistor R69 by means of the signal coupled through capacitor C17. Capacitor C16 acts to reduce the value of high frequency noise signals. The network consisting of resistors R49, R50 and diode D14 serves to limit the positive excursion of the operational amplifier IC-4b output voltage. Bias is provided from the reference signal level of 11 volts to the positive input of the operational amplifier by means of resistor R51. The output of operational amplifier IC-4b normally lies between the limits of 6 volts and 16 volts with the more positive voltage calling for increased field current. This output voltage is applied to the field current output amplifier 5.

5. FIELD CURRENT OUTPUT AMPLIFIER

Figure 2B:
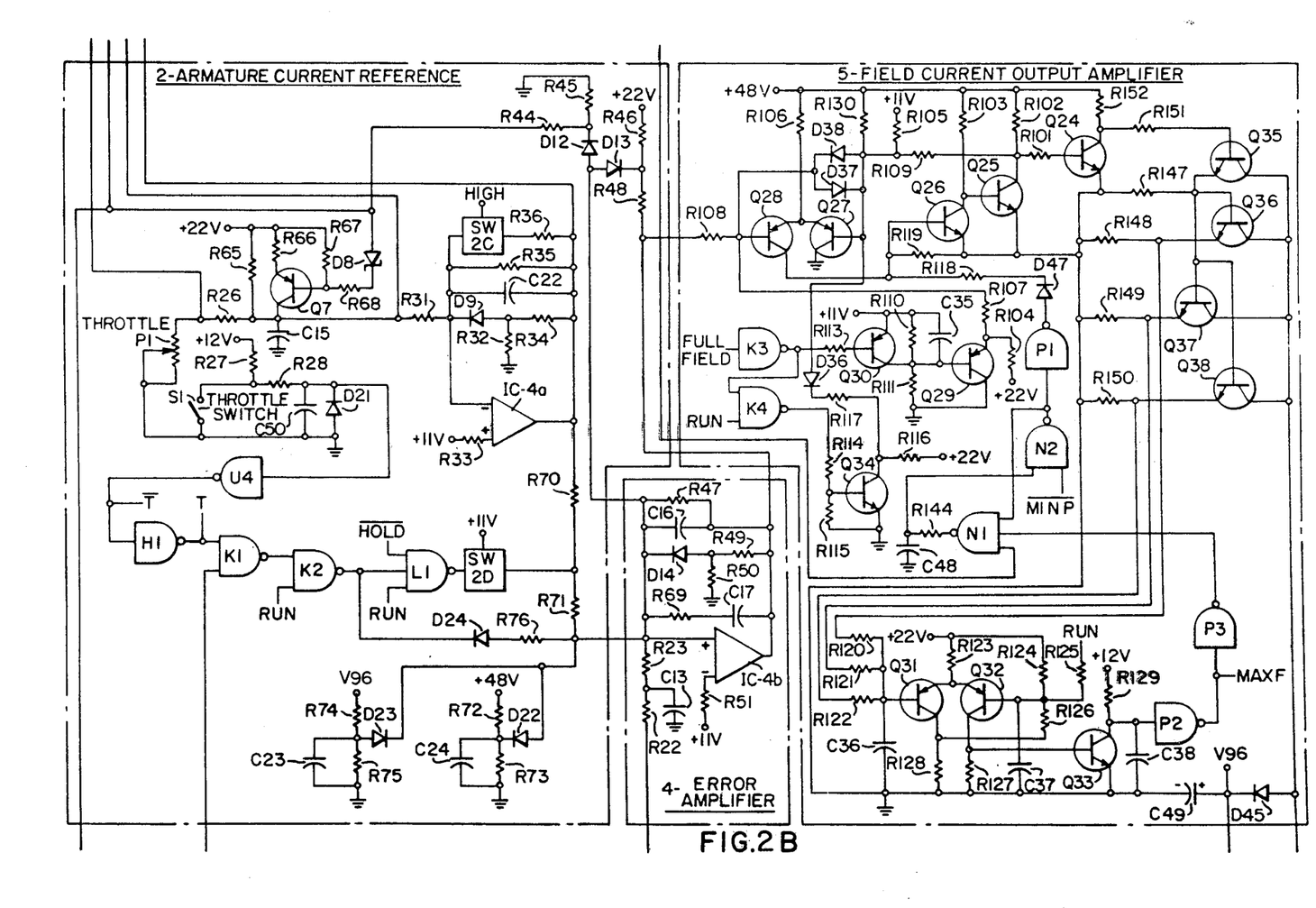
Figure 2C:
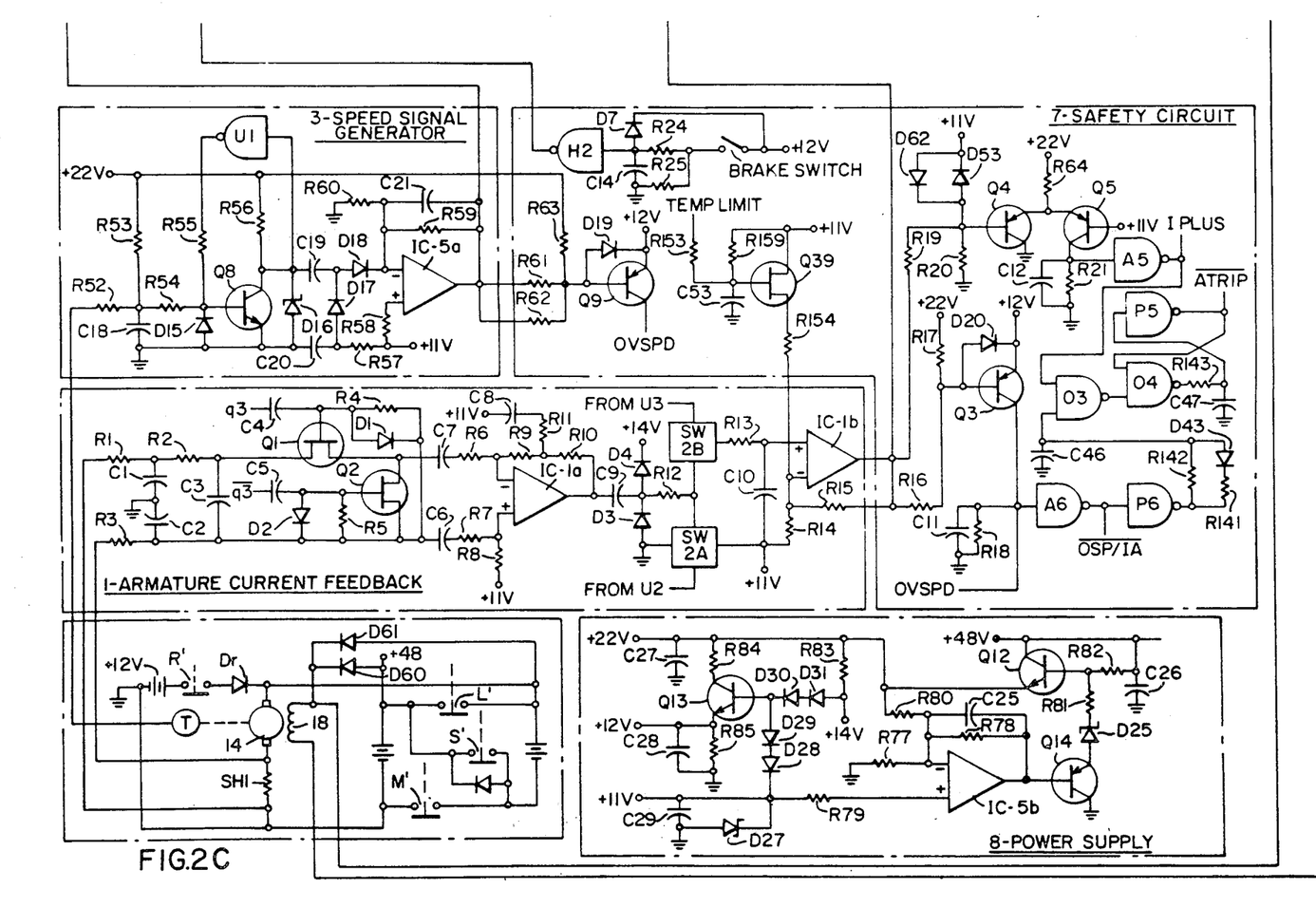

The field current output amplifier 5 amplifies the voltage signal from operational amplifier IC-4b and provides a field current output to the motor. Pulse width modulation is used to maintain high efficiency when operating from either the 48 volt or 96 volt connection. A pulse width modulation frequency of 2 kHz is used as determined by the signal applied to gate $K_3$. Under normal operating conditions, this signal has a value of ONE for a small fraction of the cycle and a ZERO value for the remainder of the cycle. The ONE period corresponds to the minimum conduction time desired for the output stage, and thereby determines a minimum value of field current. During this ONE signal, the output of inverting gate $K_3$ is at zero volts which draws a current through resistor R113 that causes transistor Q30 to conduct. When transistor Q30 conducts, it discharges capacitor C35. When the input signal to gate $K_3$ is a ZERO, transistor Q30 is blocked and capacitor C35 is charged in the negative direction by resistors R110 and R111. This produces a negative exponential waveform across capacitor C35. This signal will be referred to as the saw-tooth modulation waveform for the pulse width amplifier. The impedance of this signal is lowered by the emitter follower consisting of transistor Q29 and resistor R104. This signal is coupled to the voltage comparator consisting of transistors Q27, Q28 and resistor R106 by means of resistor R107. The field demand signal from operational amplifier IC-4b is coupled to the voltage comparator through resistor R108. Diodes D37 and D38 serve to protect the base-emitter junctions of transistors Q27 and Q28 from excessive voltage. The current in transistor Q28 switches between an essentially fixed level and a value of zero depending on whether the voltage of the base of transistor Q28 is more negative or more positive than the voltage of the base of transistor Q27. Switching from one current state to the other occurs when the voltages at the bases of transistors Q27 and Q28 are approximately equal. Since the voltage at the base of transistor Q28 depends on the sum of the saw-tooth modulation waveform and the field demand signal, a change in the field demand signal will shift the point on the saw-tooth modulation waveform at which the current changes from one value to the other. Therefore, the voltage comparator acts as a pulse width modulator having a width of conduction dependent upon the field demand signal. The pulse width signal from the collector of transistor Q28 is applied to the base of transistor Q26 and causes transistor Q26 to switch between the conducting and blocked states. The output of transistor Q26 is amplified and inverted by transistor Q25, and the output of transistor Q25 is amplified and inverted by transistor Q24. A positive feedback signal from the collector of transistor Q25 is fed back to the base of transistor Q27 by means of resistor R109 for the purpose of providing hysteresis and more rapid switching. Resistor R105 serves to bias the base of transistor Q27 near 11 volts. Resistor R130 provides a coupling from the 48 volt battery supply to the base of transistor Q27 which tends to keep the field output current constant as the battery voltage decreases. This action is obtained by a shift in the comparator voltage which serves to increase the conducting pulse width as the battery voltage decreases.

In order to ensure that the comparator Q27-Q28 is in the proper state to cause output field current conduction during the minimum pulse width signal provided at the input of gate $K_3$, a negative current is applied to the base of transistor Q27 through diode D36 and resistor R117. This current flows when transistor Q34 is conducting. Transistor Q34 conducts whenever the output of NAND gate $K_4$ is in a ONE state. This ONE state occurs whenever the output of inverter $K_3$ is a ZERO which corresponds to the input signal to $K_3$ being a ONE. Transistor Q34 is also made to conduct when the signal RUN, which is applied to the input of gate $K_4$, is a ZERO. This occurs during motor idling conditions.

A ZERO signal is applied to gate $P_1$ whenever it is desired to cut off conduction of the output stage driving the field. This zero signal produces a ONE output from inverter $P_1$ which causes diode D47 to conduct. This current flows through resistor R118 and causes transistor Q26 to conduct which causes the output stage consisting or transistors Q35, Q36, Q37 and Q38 to block.

When transistor Q26 conducts, transistor Q25 blocks and transistor Q24 conducts. This causes the collector signal of transistor Q24 to be at approximately zero volts. This voltage is applied to the base of transistor Q35 through resistor R151 which causes transistor Q35 to block. With transistor Q35 blocked, resistor R147 holds the bases of transistors Q36, Q37, Q38 at zero volts which renders them in the blocking or non-conducting state.

The motor field is connected between the V96 terminal and the collectors of transistors Q35, Q36, Q37 and Q38. A free-wheeling diode D45 is connected across the field to provide a path for the field current to circulate during the time when transistors Q35, Q36, Q37 and Q38 are blocking. The field current will decrease in magnitude during the time that the current circulates through diode D45. To increase the field current, transistors Q35, Q36, Q37 and Q38 are made to conduct, thereby causing their collectors to assume a potential of approximately 2 volts. This places a large voltage across the field which causes the field current to increase. The field current may be made to assume any desired value by correctly proportioning the time during which output transistors Q35, Q36, Q37 and Q38 conduct. Normally, transistors Q35, Q36, Q37 and Q38 conduct during a portion of each cycle of the 2kHz modulating waveform.

During the time that transistors Q35, Q36, Q37 and Q38 conduct, their emitter currents flow through resistors R148, R149 and R150. The sum of these currents, neglecting the small current which flows through resistor R147, is equal to the value of the field current. The voltages across the resistors are averaged by resistors R120, R121 and R122 to provide a voltage proportional to the field current. This voltage is applied to the base of transistor Q31 and is compared in magnitude to the voltage at the base of Q32 which represents the maximum permissible value of field current. When the value of field current is excessive, transistor Q32 conducts and transistor Q31 blocks. The conduction of transistor Q32 causes transistor Q33 to conduct which provides a ZERO signal to the input of inverting gate $P_2$. This causes the output of gate $P_2$, which is called MAXF, to be a ONE. When MAXF is a ONE, it represents the condition of maximum permissible field current. This ONE signal is applied to the input of inverting gate $P_3$ which applies a ZERO input to an input $N_1$ of flip-flop $N_1$–$N_2$. This causes the output of gate $N_2$ to apply a ZERO value to the input of gate $P_1$ which results in cutting off the output stage Q35, Q36, Q37 and Q38. Therefore, when the output current exceeds the maximum desired value, it results in cutting off the output stage transistors Q35, Q36, Q37, Q38 which in turn reduces the field current. Flip-flop $N_1$–$N_2$ is reset during each cycle of the 2 kHz modulating signal by signal MINP applied to gate $N_2$. Signal MINP lasts for only a small fraction of the cycle corresponding to the minimum pulse width signal. The output transistors Q35–Q38 remain non-conducting during the remaining portion of the cycle until the field current falls below the maximum desired value.

The value at which the maximum field current is regulated depends upon the logical value of the signal RUN. Before the motor 14 has been started and during the time that the motor 14 is idling, RUN is equal to ZERO, which results in a zero voltage being applied to resistor R125. This signal biases transistor Q32 of the regulator and causes it to regulate the maximum field current at a level of 8 A. This serves to conserve battery power, reduce heating of the field winding 18 and to insure that this value of maximum field current can be obtained even under low battery conditions. This latter condition is necessary because the safety circuits 7 require that the maximum field signal be present in order for the motor 14 to be started. Once the motor 14 is started, RUN becomes a ONE which applies a 12V signal to resistor R125 and results in the maximum value of field current being regulated at about 12A.

6. LOGIC

Logic gates $B_1$, $B_2$, resistors R131 and R132, and capacitor C40 form a 64 kHz oscillator as described in the RCA COS/MOS Integrated Circuit Manual (Technical Series CMS-271). The output of this oscillator consists of a rectangular waveform that is connected to the input of binary counter C. The following square wave outputs are taken from the binary counter: q2 at 16 kHz, q3 at 8 kHz, q4 at 4 kHz and q5 at 2 kHz. The complements of these signals are provided by inverting gates $A_1$, $A_2$, $E_5$ and $E_6$ respectively.

The ZERO period of square wave Q3 is shortened by the pulse shaping circuit consisting of logic gates $A_3$ and $A_4$, resistor R112, capacitor C39 and diode D39. When q3 becomes a ONE, diode D39 conducts and quickly discharges capacitor C39. Therefore, the ZERO-to-ONE transition at gate $A_4$ is delayed by only a short value of time. However, when q3 becomes a ZERO, the output of gate $A_3$ becomes a ONE and capacitor C39 is slowly charged positive through resistor R112. This causes the output from gate $A_4$, which corresponds to the ONE-to-ZERO transition of q3, to be delayed. The result is that the output from gate $A_4$ has a shorter ZERO period than square wave signal q3.

When in the high voltage battery connection, LOW = ZERO and logic gate $B_4$ simply inverts the signal from logic gate $A_4$. The output from gate $B_4$, the ONE period of which represents the minimum pulse width desired for the pulse width modulator conduction, is combined with the q4 and q5 signals in date $D_1$ to provide a signal having a 2 kHz repetition rate and a ZERO period corresponding to the minimum pulse width. This signal is called MINP. This signal is applied to gate $G_1$ and provides a ONE output from gate $G_1$ during the minimum pulse period. When in the low battery connection, LOW is a ONE which gates the q2 signal through gate $B_3$ into gate $B_4$. This results in approximately a 50% increase in the minimum pulse width.

The following description of the logic will be related to the sequence of events beginning with energizing the control, running at low speed, accelerating to high speed, returning to the low speed, running at idle speed, and finally shutting off the controller. When the car key switch is turned on, 48 volts is applied to the controller power supply and the Key 12V voltage is connected to the Q21 output stage. The power supply provides the +22, +14, +12 and +11 voltages to the circuit. The +48V is also applied to the V96 terminal at the cathode of D45 of the field current output stage by means of diode D60. At this point the motor is not running and the signal RUN is in the ZERO state, which results in a zero voltage being applied to resistor R125 associated with voltage comparator Q31, Q32. This selects a maximum field current of approximately 8 amperes and, since the RUN signal applied to gate $K_4$ is a ZERO, the pulse width modulated field output amplifier demands this maximum field current of 8 amperes. The presence of this maximum regulated field current causes the signal MAXF to be a ONE.

When the throttle pedal is depressed, throttle switch S1 opens causing signal T to become a ONE. With both MAXF and T being equal to ONE at the input of gate $G_2$, gate $G_2$ produces a ZERO output which sets the flip-flop $F_1$–$J_1$ such that the signal RUN becomes a ONE. At this time the signal UP is a ZERO and the signal LOW is a ONE so that the signals applied to the input of gate $J_3$ are all in the ONE state, which provides a ZERO output from $J_3$ which is inverted to provide a ONE output from gate $M_1$. This signal is inverted by gate $M_2$ which provides a zero voltage output to resistor R91 which causes transistor Q16 to block and permits resistor R86 to energize transistor Q15 which conducts and energizes the coil of contactor L. This closes the contacts of contactor L' which connects 48V to the armature of the motor thereby causing the motor to accelerate to approximately 960 rpm. The ONE signal from $M_1$, after a delay of several tenths of a second as determined by resistor R138 and capacitor C51, causes inverter $M_3$ to change state from a ONE to a ZERO which results in transistor Q18 blocking and transistor Q17 conducting and energizing contactor M'. This places the second half of the battery pack 16 in parallel with the first battery pack 16 across the armature of the motor 14. This delay is provided so that the starting of the motor 14 occurs at a somewhat higher impedance, thereby reducing the motor 14 inrush current. During this delay of several tenths of a second, the signals from inverters $M_1$ and $M_3$, applied to gate $F_4$, are both in the ONE state. This produces a ZERO from the output of gate $F_4$ which is applied to an input of gate $G_1$ to demand full field current from the field current output amplifier. At the end of this delay when the output from inverter $M_3$ becomes a ZERO, this full current demand signal is removed and the field current depends upon the throttle setting. The ZERO output from gate $M_3$ also sets flip-flop $G_3$–$H_5$ which energizes the coil of relay R by means of transistors Q22 and Q21. Relay R connects a 12V battery to the armature through a diode Dr whose cathode is at the armature voltage. Since the armature is connected to 48V at this time, this diode Dr does not conduct. However, at a later time when the motor 14 slows to several hundred rpm and the armature voltage falls below 12V, this diode Dr will conduct and keep the motor 14 idling at several hundred rpm. This flip-flop $G_3$–$H_5$ is reset when the power is removed from the controller.

If the throttle P1 is further depressed, an increased value of armature current is demanded which results in an armature current error which in turn reduces the field current. This causes an increase in armature current and the motor accelerates to a higher speed. As the speed increases to a value in the range of 1500–1900 rpm, the speed signal generator 3 output applied through resistor R41 becomes less positive. This signal is summed at the base of transistor Q10 along with a throttle P1 voltage signal coupled through resistor R40, an armature current reference signal coupled through resistor R39, a battery voltage signal coupled through resistor R38, and a zero volt bias signal coupled through resistor R37. When the voltage at the base of Q10 falls below the 11V reference voltage applied to the base of Q11, transistor Q10 will conduct and its collector will provide a ONE input to gate $G_4$. The signal T is also a ONE, as long as the throttle remains depressed, and therefore the output of gate $G_4$ will be a ZERO. This output is called SPD and is applied to gate $F_2$ of flip-flop $F_2$–$J_2$. When SPD becomes a ZERO, it sets flip-flop $F_2$–$J_2$ and the output of gate $E_1$, which is driven by this flip-flop, becomes a ONE. This output is called UP and when it becomes ONE, it indicates that the control should begin the sequence required to reconnect from 48V to 96V.

When UP becomes a ONE, the UP signal applied to gate $J_3$ becomes a ZERO which results in de-energizing the L and M contactors. Diode D42 acts to discharge capacitor C51 rapidly and avoid an unnecessary delay for the signal coupled between the gates $M_1$ and $M_3$.

At this point in time, the UP and LOW signals applied to gate $F_3$ are both in the ONE state and therefore a ZERO output is obtained from gate $F_3$. Capacitor C41 is discharged after a short delay through the parallel paths of resistors R133 and R134, since diode D40 conducts when the output of $F_3$ is at the zero volts. The output across capacitor C41 becomes ZERO and this signal is applied to gate $G_1$ and demands full field current regardless of other signals applied to G1. As the field current is increased with contactors L, M and S open, the motor 14 acts as a generator and applies an increasing voltage to the field. This further increases the rate of rise of field current so that the full field current is reached within a few tenths of a second and the motor emf rises toward 96V.

Meanwhile, the delayed UP signal, which is delayed by resistor R140 and capacitor C45, rises to a ONE value. This signal is applied to inverter $H_4$ and produces an output signal LOW = ZERO. This signal is inverted by inverter $M_4$ to produce signal HIGH = ONE. The combination of UP, RUN and HIGH all having a value of ONE applied to gate I produces a ZERO output which is coupled through gates $M_5$ and $M_6$ and transistor Q20 to turn on transistor Q19 and energize the S contactor. This contactor connects the two battery strings in series to provide 96V to the motor armature and by means of diode D61 to the V96 connection to the cathode of diode D45 of the field current amplifier.

When the signal LOW becomes ZERO, the output of gate $F_3$ returns to a ONE condition. This signal is delayed by resistor R134 and capacitor C41 for about a tenth of a second to allow time for contactor S to close before applying a ONE signal to gate $G_1$ and thereby removing the full field current demand. During the time that the full field demand signal is applied, the output from capacitor C41 is coupled by means of gates $E_2$ and $E_3$, $O_1$, $P_4$, and $L_1$ to switch 2D. This switch 2D of the armature current reference 2 provides a ZERO armature current reference demand signal at the junction of resistors R70 and R71 which matches the near ZERO armature current which results from contactors L, M and S all being open. This prevents a large error signal from building up at the output of operational amplifier IC-4b which could cause an undesirable transient upon removal of the full field current demand signal.

With HIGH = ONE, the motor 14 is run with 96V applied to the armature. As the throttle P1 is depressed, the motor speed will increase toward its full speed value of 3300 to 3600 rpm.

When slowdown of the vehicle 10 is desired, the operator will reduce the throttle P1 setting. This will reduce the current demand reference toward zero amperes and may even result in a negative current (regenerative current) demand. If a throttle setting of less than about 5% occurs, throttle switch S1 will close and T will become a ONE. As the motor 14 slows down, the value of the field current will be increased in order to maintain the desired value of field current at lower motor speed. When the field current reaches its maximum regulated value, MAXF will become a ONE. As the motor slows further, the magnitude of the negative armature current (regenerative current) will be reduced and output IPLUS of logic gate $A_5$ of the armature current comparator described below under "Safety" will become a ONE. This indicates that the amount of regenerative current has become negligible.

At this point the inputs to logic gate $D_3$, MAXF, T and IPLUS are all ONE's which provides a ZERO output from gate $D_3$ to reset flip-flop $F_2$-$J_2$ to the state corresponding to UP = ZERO. This indicates that the sequence to reconnect the batteries from 96V to 48V should be initiated. The UP = ZERO signal is applied through gates I, $M_5$, $M_6$, and transistors Q20 and Q19 to de-energize contactor S. With the signals UP and HIGH applied to gate $O_2$ both being ONE's, the output of gate $O_2$ becomes a ZERO and, after a delay determined by the parallel combination of resistors R145 and R146 and capacitor C52, sets flip-flop $N_1$-$N_2$ to a state that demands minimum field current. The motor emf, which is only applied to the motor field since contactors L, M and S are all open, falls toward a value near 48V as the field current is reduced.

The UP signal transition from a ONE to a ZERO is delayed for about a tenth of a second by resistor R140 and capacitor C45 in order to permit time for contactor S to open before beginning to energize contactors L and M. At the end of this delay, the output of capacitor C45 changes the output of gate $H_4$ to a ONE. This output signal called LOW then becomes a ONE and is applied through gate $M_4$ to make its output signal HIGH become a ZERO. Since the RUN, UP and LOW signals are all ONE at this time, they act through gates $J_3$, $M_1$, $M_2$ and $M_3$ and transistors Q16, Q15, Q18 and Q17 to energize contactors L and M which connect the 48V battery strings in parallel to the armature of the motor.

The transition of HIGH to a ZERO causes the output of gate $O_2$ to become a ONE. This signal is delayed by resistor R146 and capacitor C52 for about a tenth of a second to permit contactor S to pull in before removing the minimum field signal. During the transition period from 96V to 48V, the signal from capacitor C52 is coupled through gates $O_1$, $P_4$ and $L_1$ to switch 2D. This provides a ZERO reference current signal as previously described to prevent the build up of an excessive error signal at the output of operational amplifier IC-4b.

If the throttle remains at a low setting, a regenerative current will again flow and result in further slowing of the vehicle and motor. The field current which had a low value at the time that contactors L and M pulled in, following the reconnection from 96V to 48V, is now increased to provide the desired armature current as the motor slows. Once the mzximum value of field current is reached, the value of regenerative current will diminish and IPLUS will finally become a ONE, indicating negligible regenerating current. Assuming that a zero throttle setting still exists, the signals LOW, T and IPLUS applied to gate $D_2$ will all be ONE's and provide a ZERO output from gate $D_2$. This ZERO output will discharge capacitor C42 through resistor R136 and result in a ZERO signal being applied to gate $J_1$ to reset the $F_1$—$J_1$ flip-flop. This produces a RUN = ZERO output which opens contactors L and M. With the armature disconnected from both the 48V and 96V battery connections, the motor will slow down until its back emf falls below 12V, at which time the 12V battery will provide current through relay contacts R and the series diode Dr to the motor armature. This will keep the motor running at an idle speed of about 200 rpm which maintains pump pressure in the automatic transmission and provide for smoother vehicle restarting without dissipating excessive power in either the motor or the automatic transmission. Idling at 200 rpm requires only about 100 watts as opposite to 500 or more watts at 960 rpm. When the key is turned off, relay R will open and all voltages will be removed from the controller. The motor will then stop and all capacitors in the control will discharge. When the key is turned on again, all of the flip-flops in the control will come on in the reset state because of the R-C networks applied in one side of the flip-flop cross coupling. These R-C networks also increase the time necessary to set the flip-flops and thereby provide increased immunity to noise. R137 and C43 are a typical example of the R-C network for flip-flop $F_1$-$J_1$. Similar networks are used for flip-flops $F_2$—$J_2$, $O_4$-$P_5$ and $N_1$-$N_2$.

To reduce battery drain and field dissipation the field current regulator level is reduced from 12A to 8A when RUN = ZERO. This is accomplished by means of resistor R125. This also ensures that the MAXF signal will be present during idling and before motor start-up when the field operates from voltages in the 48-volt range. Under low voltage conditions it may only be possible to reach 11A field current. Reducing the regulated level to 8A ensures that MAXF is a ONE since this is what regulates the field current. MAXF = ONE is needed for setting RUN = ONE.

Switch 2A is made conductive during the latter portion of one-half of the 8 kHz chopping period. This signal is derived in NOR gate $U_2$ using input signals q2 and q3. Similarly, switch 2B is made conductive during the latter portion of the other half of the 8 kHz period by means of signals q2 and q3 applied to NOR gate $U_3$.

A 12 V signal is provided to control the automatic transmission by means of transistor Q23 and resistors R99 and R100. This transistor Q23 is made to block when HIGH = ONE as controlled by the signal from gate H₃ and resistor R98. Capacitor C34 across the transistor Q23 protects the transistor Q23 from noise impulses.

There are unusual conditions that will prevent reconnection from 48V to 96V. One such condition is getting a wheel of the vehicle stuck in a severe road depression. Under these conditions, the motor speed will remain below the value needed to call for reconnection to 96V. Another possible condition would be a severe grade with a discharged battery. Under these conditions the additional power available in the 96V connection is required even though the reconnection cannot be achieved in a fully smooth manner. The circuit consisting of resistors R155 and R156, capacitor C54, diodes D48, D49 and D50, and transistor Q40 serves to sense when the throttle is fully depressed. Under these conditions the input to resistor R155 approaches ground potential and transistor Q40 will be blocked. Under this condition resistor R157 applies a positive potential to the long time constant filter consisting of resistor R160 and capacitor C55. After a time of approximately 2½ seconds, this filter will apply a ONE signal to gate U₅. The output of gate U₅ becomes a ZERO which causes diode D52 to conduct and draw current through resistor R158. This current reduces the motor speed at which the reconnection from 48V and 96V occurs by about 600 rpm, and therefore insures that the reconnection will occur. Under normal operating conditions with the throttle fully depressed, the motor speed will increase to a value sufficient to cause reconnection from 48V to 96V in approximately one second. Therefore, the time delay of resistor R157 and capacitor C55 will prevent any response from gate U₂ and diode D52 will remain in its normally non-conducting state.

7. SAFETY CIRCUITS

A number of safety circuits 7 are provided to protect the controller and the vehicle in case of malfunctions or human error. When the brake is applied, the brake switch connects a 12V signal through a filter consisting of resistor R24, capacitor C14 and diode D7 to gate H₂. The resulting ZERO output from gate H₂ acts through gates K₁, K₂ and L₁ to make switch 2D conduct and cancel any input signal provided from the throttle potentiometer. At the same time, the ZERO output from gate K₂ causes diode D24 to conduct which provides a regenerative braking command. Therefore, depressing the brake results in a regenerative braking action from the motor even if the throttle is stuck in a fully depressed position.

The output of the speed signal generator from operational amplifier IC-5a is applied by means of resistors R61, R62 and R63 to an overspeed detection transistor Q9 which conducts if the motor speed exceeds 3700 rpm. Conduction of this transistor Q9 causes a ONE signal to be applied at the input of gate A₆. This signal is inverted by gate A₆ and applied to gate G₁ to demand full field current from the field current output amplifier. The increased field current when operating at this high motor speed will cause regenerative braking which should slow the vehicle. As soon as the motor speed is reduced below 3700 rpm, the full-field demand signal will be automatically removed. If there is a malfunction in the control circuit and the full field signal is not successful in reducing the motor speed, then emergency action is necessary. In that case the signal from A₆, which is coupled through gate P₆ to the delay circuit consisting of resistors R141, R142, diode D43, capacitor C46, is utilized. In this case the output signal from P₆ is a ONE and it is delayed for several tenths of a second by resistor R142 and capacitor C46. If after this delay time the armature current has not achieved a substantial regenerative value, the IPLUS signal applied to gate O₃ will be a ONE along with the delayed ONE signal from capacitor C46. This will result in a ZERO output from gate O₃ which will set the trip flip-flop consisting of gates O₄ and P₅ such that ATRIP becomes a ZERO. This signal is applied to gate J₁ of flip-flop F₁-J₁ and resets RUN to a ZERO. This causes all of the armature circuit contactors to open and remain open.

The voltage output of operational amplifier IC-1b, which represents the armature current, is applied to overcurrent detecting transistor Q3 by means of resistor R16. Resistor R17 serves to bias the switching point of trnasistor Q3 at an appropriate value. If the armature current exceeds 500 A, transistor Q3 will conduct and apply a ONE input signal to inverting gate A₆. The resulting ZERO output from gate A₆ is applied to gate G₁ and results in a full field current output signal from the field current output amplifier. This signal should quickly reduce the value of armature current below the 500 A level and thereby cause transistor Q3 to return to its normally blocking condition. If this does not occur, it indicates a malfunction of the control circuitry. In this cause the same series of events involving gates P₆, O₃ and the trip flip-flop O₄-P₅ as described above for the overspeed condition, will result in opening contactors L, S and M.

The output signal from operational amplifier IC-1b is applied to comparator Q₄-Q₅ by means of resistors R19 and R20. The values of resistors R19 and R20 are selected so that transistor Q4 will be blocked only if a substantial regenerative current of at least −10 A is flowing. Thus, for zero or positive armature current, transistor Q4 will be conducting and Q5 will be blocked. This provides a ZERO input to gate A₅ which produces a ONE signal at its output. This output signal is called IPLUS and indicates a near zero or positive armature current value.

If the motor was started without a field signal being present, excessive values of armature current would be drawn. To prevent this condition, a field current must be present having a value equal to the maximum regulated value of 8 A. When this value is present, the signal MAXF will be a ONE. This signal, in addition to the signal T = ONE, must be present at the input of gate G₂ in order to set flip-flop F₁-J₁, which results in starting the motor.

If the motor is subjected to high currents for a continuing period, such as would be the case for climbing an exceptionally long, steep grade, the motor may overheat to a point where it is necessary to cut back on the maximum available armature current even though the performance of the vehicle is appreciably degraded. A temperature sensor placed in the motor is used to sense a condition of excessive temperature. Under overtemperature conditions this sensor will apply a 12V signal through resistor R153 to transistor Q39. This signal will cause transistor Q39 to conduct and in effect place resistor R154 in parallel with resistor R14. This will result in increasing the gain of operational amplifier IC-1b. This will result in an increase in the armature current feedback signal for a given level of armature current. Since the armature feedback signal is compared with the armature reference signal, this will result in reducing the actual armature current to the motor. The motor will therefore dissipate less heat although the performance of the vehicle will be adversely affected. Under normal conditions resistor R159 will keep transistor Q39 in a blocking condition and R154 will not influence the operation of the circuit.

8. POWER SUPPLY

The power supply 8 operates from the nominal 48V battery connection. Capacitor C26 serves to filter out transient voltage spikes. When the batteries are badly discharged, the actual value of this voltage may drop as low as 27V. During regenerative conditions the voltage may rise as high as 60V. This supply is designed to provide regulated voltages of +22V, +14V, +12V and +11V even though the input voltage varies over the wide range indicated above. Furthermore, the +11V voltage, which is used to represent a virtual ground or zero reference signal for the control, is designed to be exactly one-half of the 22V voltage. This is accomplished by comparing the 11V signal with a signal representing one-half of the 22V signal as provided by resistors R80 and R77. This comparison takes place in operational amplifier IC-5b, the output of which drives amplifying transistor Q14. Q14 is coupled to a series regulating transistor Q12 by means of diode D25 and resistors R81 and R82. Transistor Q12 is made to conduct just enough current to maintain the value of the 22V output from its emitter to be equal to twice the value of the 11V reference. As the value of the 48V signal changes, the current drawn through resistor R81 is charged to compensate for changes in the current in resistor R82.

The +11V and +14V voltages are derived through a Zener-diode, diode regulating chain consisting of Zener-diode D27 and diodes D28, D29, D30 and D31 and resistor R83. The base of transistor Q13 is connected into this regulating chain. The voltage from its emitter is used to supply the +12V voltage to the logic circuitry. Transistor Q13 isolates the fluctuating demand current drawn by this logic from the Zener-diode, diode chain. Capacitors C27, C28 and C29 are used to bypass to ground the +22V, +12V and +11V supplies respectively.

The disclosed invention has several advantages over the prior art such as switching from the low voltage battery connection to the high voltage battery connection as soon as possible. This provides best performance, higher available torque and increases efficiency. The disclosed system takes into account various conditions of the battery and switches sooner to the higher voltage condition for low battery voltage. The disclosed electrical system also takes into account the current demand and switches to the high voltage condition sooner for a very heavy current demand. The disclosed system remains in a high voltage connection as long as feasible and provides regeneration as long as practical.

FIG. 9 is a block diagram of the control circuit 42 shown in FIG. 2 and descirbed fully above.

I claim:
1. An electric vehicle comprising:
a direct current drive motor;
a separately excited field winding disposed within said direct current drive motor;
throttle means for controlling the speed of said direct current drive motor;
armature current feedback means connected to said direct current drive motor to provide a feedback signal proportional to the armature current flowing through said direct current drive motor;
armature current reference means connected to said throttle providing an armature demand reference signal dependent on the position of said throttle;
error amplifier means connected to said armature current feedback means and said armature current reference means for comparing the armature feedback signal and the armature demand reference signal and providing a field demand signal depend on the difference between the feedback signal and the reference signal;
field current output amplifier means connected to said error amplifier and said separately excited field winding providing current flow through said separately excited field winding in response to the error signal received from said error amplifier means;
armature demand reference signal reducing means connected to said armature current to said armature current reference means for providing a modified armature demand reference signal when activated;
speed detector means connected to detect the speed of said direct current drive motor and to provide a signal proportional to the direct current drive motor speed; and,
said speed detector means being connected to said armature demand reference signal reducing means for reducing the armature demand reference signal when the speed of said direct current drive motor exceeds a predetermined value.
2. An electric vehicle as claimed in claim 1 wherein: said speed detector means reduces the armature demand reference signal, when said direct current drive motor speed exceeds a predetermined value, by an amount related to the speed by which said direct current drive motor exceeds the predetermined speed value.
3. An electric vehicle comprising:
a direct current drive motor;
a separately excited field winding disposed within said direct current drive motor;
throttle means for controlling the speed of said direct current drive motor;
armature current feedback means connected to said direct current drive motor to provide a feedback signal proportional to the armature current flowing through said direct current drive motor;
armature current reference means connected to said throttle providing an armature demand reference signal dependent on the position of said throttle;
error amplifier means connected to said armature current feedback means and said armature current reference means for comparing the armature feedback signal and the armature demand reference signal and providing a field demand signal dependent on the difference between the feedback signal and the reference signal;
field current output amplifier means connected to said error amplifier and said separately excited field winding providing current flow through said separately excited field winding in response to the error signal received from said error amplifier means;

said direct current drive motor operable in a driving mode and a regenerative braking mode;

a power supply connected to said direct current drive motor for supplying power when said direct current drive motor is operating in a driving mode and for receiving power when said direct current drive motor is operable in a regenerative braking mode; and, overvoltage regulating means connected to limit the power being supplied to said power supply when the voltage of said power supply exceeds a predetermined level.

4. An electric vehicle as claimed in claim 3 comprising:

a battery power supply;

said direct current drive motor operable in a driving mode when said direct current drive motor is operated as a motor and a regenerative braking mode wherein said direct current drive motor is operated as a generator; and, overvoltage regulating means connected to said armature current reference means for reducing the armature current demand reference signal when said direct current drive motor is operating in a regenerative braking mode and the battery voltage exceeds a predetermined value.

5. An electric vehicle comprising:

a direct current drive motor;

a separately excited field winding disposed within said direct current drive motor;

throttle means for controlling the speed of said direct current drive motor;

armature current feedback means connected to said direct current drive motor to provide a feedback signal proportional to the armature current flowing through said direct current drive motor;

armature current reference means connected to said throttle providing an armature demand reference signal dependent on the position of said throttle;

error amplifier means connected to said armature current feedback means and said armature current reference means for comparing the armature feedback signal and the armature demand reference signal and providing a field demand signal dependent on the difference between the feedback signal and the reference signal;

field current output amplifier means connected to said error amplifier and said separately excited field winding providing current flow through said separately excited field winding in response to the error signal received from said error amplifier means;

said direct current drive motor operable in a driving mode and a regenerative braking mode;

a power supply connected to said direct current drive motor for supplying power when said direct current drive motor is operating in a driving mode and for receiving power when said direct current drive motor is operating in a regenerative braking mode; and, under voltage regulating means connected to limit the power being supplied from said power supply when the voltage of said power supply falls below a predetermined value.

6. An electric vehicle as claimed in claim 5 comprising:

a battery power supply;

said direct current drive motor operable in a driving mode when said direct current drive motor is operated as a motor and a regenerative braking mode wherein said direct current drive motor is operated as a generator; and, undervoltage regulating means connected to said armature current reference means for reducing the armature demand reference signal when said direct current drive motor is operating in a driving mode and the voltage of said battery power supply falls below a predetermined value.

7. An electric vehicle as claimed in claim 5 wherein:

said battery power supply comprises a plurality of direct current electric batteries; and, said undervoltage regulating means connected to said armature current reference means for reducing the armature demand reference signal when said direct current drive motor is operating in a driving mode and voltage of any of the plurality of direct current electric batteries falls below a predetermined value.

8. An electric vehicle comprising:

a direct current drive motor;

a separately excited field winding disposed within said direct current drive motor;

throttle means for controlling the speed of said direct current drive motor;

armature current feedback means connected to said direct current drive motor to provide a feedback signal proportional to the armature current flowing through said direct current drive motor;

armature current reference means connected to said throttle providing an armature demand reference signal dependent on the position of said throttle;

error amplifier means connected to said armature current feedback means and said armature current reference means for comparing the armature feedback signal and the armature demand reference signal and providing a field demand signal dependent on the difference between the feedback signal and the reference signal;

field current output amplifier means connected to said error amplifier and said separately excited field winding providing current flow through said separately excited field winding in response to the error signal received from said error amplifier means; and, weak field regulating means connected to said armature current reference means for reducing the armature demand reference signal when the excitation of said separately excited field winding falls below a predetermined level.

9. An electric vehicle comprising:

a direct current drive motor;

a separately excited field winding disposed within said direct current drive motor;

throttle means for controlling the speed of said direct current drive motor;

armature current feedback means connected to said direct current drive motor to provide a feedback signal proportional to the armature current flowing through said direct current drive motor;

armature current reference means connected to said throttle providing an armature demand reference signal dependent on the position of said throttle;

error amplifier means connected to said armature current feedback means and said armature current reference means for comparing the armature feedback signal and the armature demand reference signal and providing a field demand signal dependent on the difference between the feedback signale and the reference signal;

field current output amplifier means connected to said error amplifier and said separately excited field winding providing current flow through said separately excited field winding in response to the error signal received from said error amplifier means;

said throttle means supplies an output signal to said armature current reference means which is proportional to the position of said throttle means;

speed-dependent characteristic modifier means connected to said throttle means to shift the output signal of said throttle means as a function of the speed of said direct current drive motor.

10. An electric vehicle comprising:

a direct current drive motor;

a separately excited field winding disposed within said direct current drive motor;

throttle means for controlling the speed of said direct current drive motor;

armature current feedback means connected to said direct current drive motor to provide a feedback signal proportional to the armature current flowing through said direct current drive motor;

armature current reference means connected to said throttle providing an armature demand reference signal dependent on the position of said throttle;

error amplifier means connected to said armature current feedback means and said armature current reference means for comparing the armature feedback signal and the armature demand reference signal and providing a field demand signal dependent on the difference between the feedback signal and the reference signal;

field current output amplifier means connected to said error amplifier and said separately excited field winding providing current flow through said separately excited field winding in response to the error signal received from said error amplifier means;

a battery for supplying power to the electric vehicle;

said field current output amplifier means uses pulse-width modulation of the excitation voltage for supplying excitation to said separately excited field winding in response to the error signal received from said error amplifier means; and, minimum field excitation means connected to said field current output amplifier means causing said field current output amplifier to supply a minimum pulse-width excitation voltage wave for a some minimum field excitation.

11. An electric vehicle as claimed in claim 10 comprising:

supply voltage compensating means connected to said field current output amplifier to provide field current output excitation which is compensated for variation of battery voltage within a predetermined range.

12. An electric vehicle as claimed in claim 10 wherein:

field current output excitation is maintained constant as the battery voltage varies by varying the current pulse-width inversely as the battery voltage varies.

13. An electric vehicle comprising:

a direct current drive motor;

a separately excited field winding disposed within said direct current drive motor;

armature current feedback means connected to said direct current drive motor to provide a feedback signal proportional to the armature current flowing through said direct current drive motor;

armature current reference means connected to said throttle providing an armature demand reference signal dependent on the position of said throttle;

error amplifier means connected to said armature current feedback means and said armature current reference means for comparing the armature feedback signal and the armature demand reference signal and providing a field demand signal dependent on the difference between the feedback signal and the reference signal;

field current output amplifier means connected to said error amplifier and said separately excited field winding providing current flow through said separately excited field winding in response to the error signal received from said error amplifier means;

key means positionable in an on position, allowing power to be supplied to said direct current drive motor, and an off position, preventing power from being supplied to said direct current drive motor; and, idling means connected to said direct current drive motor for supplying power and field excitation to said direct current drive motor when said key means is on and the electric vehicle is stopped, to keep said direct current drive motor revolving at a predetermined idling speed.

14. A battery powered electric vehicle comprising:

a direct current drive motor operable in a driving mode and a regenerative braking mode;

a separately excited field winding disposed within said direct current drive motor;

a power supply connected to said direct current drive motor for supplying power when said direct current drive motor is operating in a driving mode and for receiving power when said direct current drive motor is operable in a regenerative braking mode;

overvoltage regulating means connected to limit the power being supplied to said power supply when the voltage of said power supply exceeds a predetermined level;

a field current output amplifier means connected to said separately excited field winding to apply current to said separately excited field winding in response to a operator and vehicle operating parameter; and, field current compensating means connected to said field current output amplifier means to compensate the field current excitation for changing battery voltage.

15. An electric vehicle as claimed in claim 14 comprising:

minimum field means connected to field output amplifier causing said field output amplifier supply current pulse having a minimum width.

* * * * *